(12) United States Patent
Maki et al.

(10) Patent No.: US 10,999,073 B2
(45) Date of Patent: May 4, 2021

(54) SECURE NETWORK COMMUNICATION METHOD

(71) Applicant: UTOPIA PLANNING CO., LTD., Tokyo (JP)

(72) Inventors: Hiroyuki Maki, Kawasaki (JP); Kunihiko Yogo, Tokyo (JP)

(73) Assignees: UTOPIA PLANNING CO., LTD., Tokyo (JP); PALACE ENTERPRISE CO., LTD., Yokohama (JP)

( * ) Notice: Subject to any disclaimer, the term of this patent is extended or adjusted under 35 U.S.C. 154(b) by 172 days.

(21) Appl. No.: 16/465,102

(22) PCT Filed: Nov. 30, 2017

(86) PCT No.: PCT/JP2017/043897
§ 371 (c)(1),
(2) Date: May 29, 2019

(87) PCT Pub. No.: WO2018/101488
PCT Pub. Date: Jun. 7, 2018

(65) Prior Publication Data
US 2019/0296911 A1    Sep. 26, 2019

(30) Foreign Application Priority Data

Dec. 1, 2016 (JP) .............................. JP2016-244851

(51) Int. Cl.
*H04L 9/32* (2006.01)
*H04L 9/08* (2006.01)
*G06F 21/44* (2013.01)
*H04L 29/06* (2006.01)

(52) U.S. Cl.
CPC .............. *H04L 9/321* (2013.01); *G06F 21/44* (2013.01); *H04L 9/08* (2013.01); *H04L 9/083* (2013.01);
(Continued)

(58) Field of Classification Search
CPC ... H04L 63/061; H04L 9/3226; H04L 9/0891; H04L 9/3236; H04L 9/0643;
(Continued)

(56) References Cited

U.S. PATENT DOCUMENTS 9,137,012 B2 * 9/2015 Bailey .................. H04L 9/3228
9,755,825 B2 * 9/2017 O'Brien ................ H04L 9/0844
(Continued)

*Primary Examiner* — Shanto Abedin
(74) *Attorney, Agent, or Firm* — Greer, Burns & Crain, Ltd.

(57) ABSTRACT

A secure-network-communication method capable of encrypting communications from a data-generation source to the entrance of a database regardless of the means of communication, which includes: (1) initialization of an endpoint, whereby the application gateway generates asymmetric authenticators, stores one of the authenticators in a whitelist and stores the other authenticator in the endpoint; (2) authentication at the time of initialization of the endpoint, whereby, if a relay gateway determines that the endpoint is valid, the relay gateway generates asymmetric authenticators including random numbers, and updates and stores the authenticators at the application gateway and at the endpoint, respectively; and (3) arrangement of common keys, whereby the relay gateway generates each part of two different encryption keys, and the application gateway, and transmits each part of the two different encryption keys to the application gateway and the endpoint, and the application gateway and the endpoint respectively generate different encryption keys which are stored.

10 Claims, 10 Drawing Sheets

(52) U.S. Cl.
CPC .......... *H04L 9/0869* (2013.01); *H04L 9/0894* (2013.01); *H04L 9/32* (2013.01); *H04L 9/3236* (2013.01); *H04L 9/3297* (2013.01); *H04L 63/061* (2013.01)

(58) Field of Classification Search
CPC ..... H04L 9/0894; H04L 9/32; H04L 63/0471; H04L 9/0869; H04L 63/126; H04L 9/321; H04L 9/083; H04L 9/08; H04L 9/3297; G06F 21/44
See application file for complete search history.

(56) References Cited

U.S. PATENT DOCUMENTS

| | | | | |
|---|---|---|---|---|
| 2002/0194475 | A1* | 12/2002 | Ishiguro | G06F 21/445 713/168 |
| 2003/0172291 | A1* | 9/2003 | Judge | H04L 63/1441 726/1 |
| 2009/0172398 | A1* | 7/2009 | Falk | H04L 63/162 713/168 |
| 2010/0250951 | A1* | 9/2010 | Ueno | H04L 9/0844 713/176 |
| 2011/0302408 | A1* | 12/2011 | McDermott | H04L 65/104 713/153 |
| 2012/0047551 | A1* | 2/2012 | Pattar | H04W 4/00 726/1 |
| 2016/0308858 | A1* | 10/2016 | Nordstrom | H04L 9/3228 |
| 2017/0272945 | A1* | 9/2017 | Link, II | H04L 9/3242 |
| 2018/0115517 | A1* | 4/2018 | Rotvold | H04L 63/061 |

\* cited by examiner

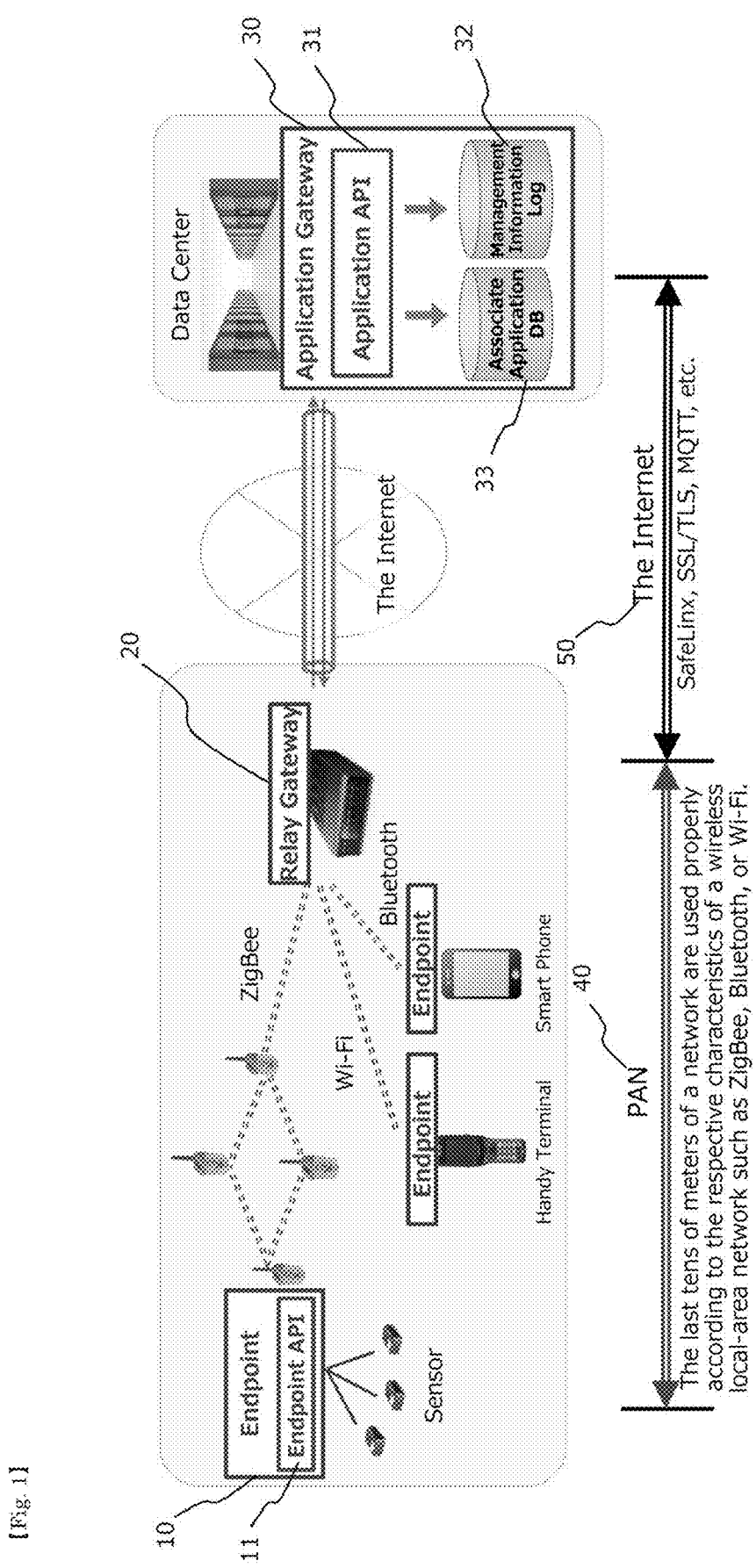
[Fig. 1]

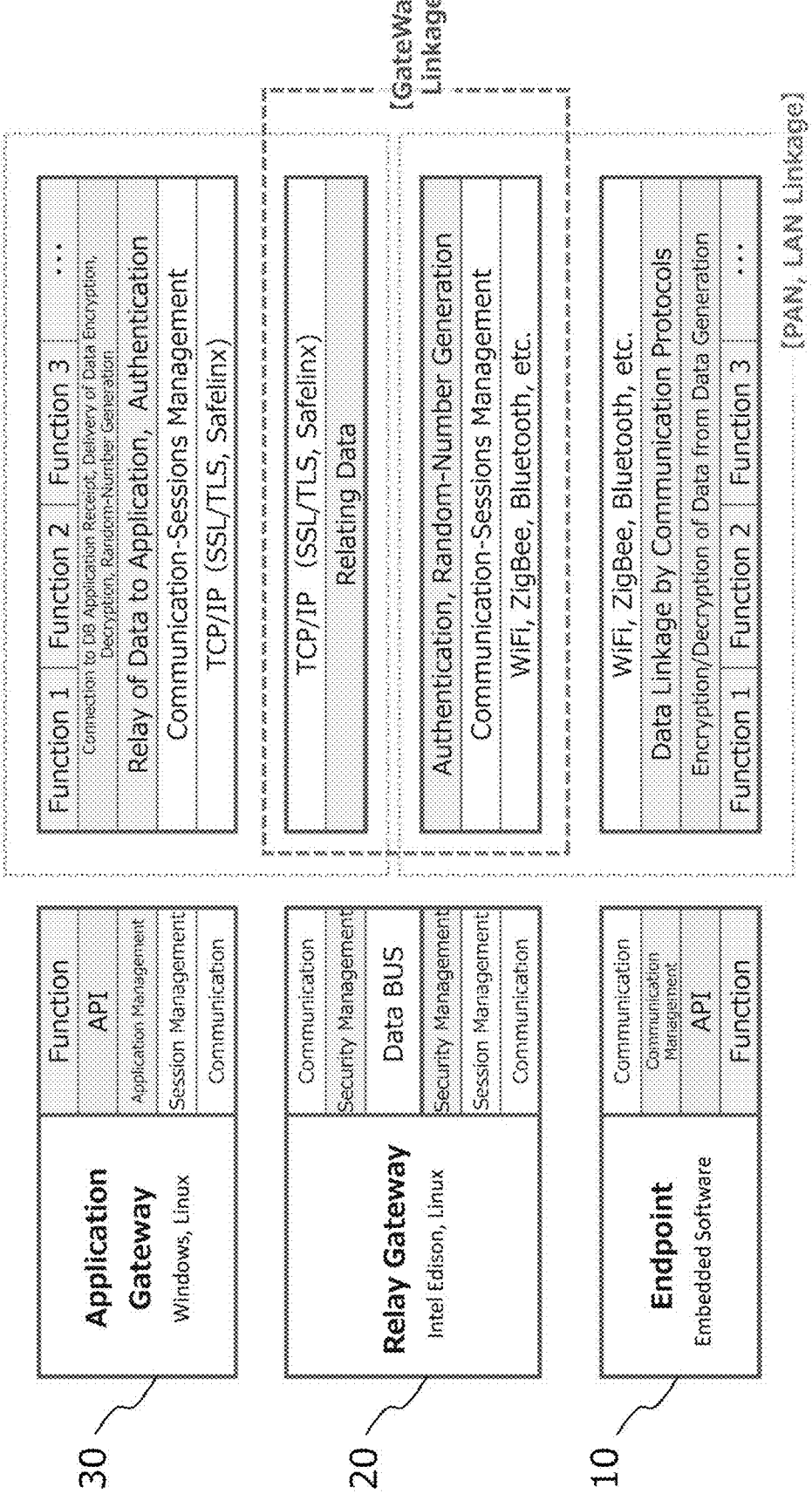
[Fig. 2]

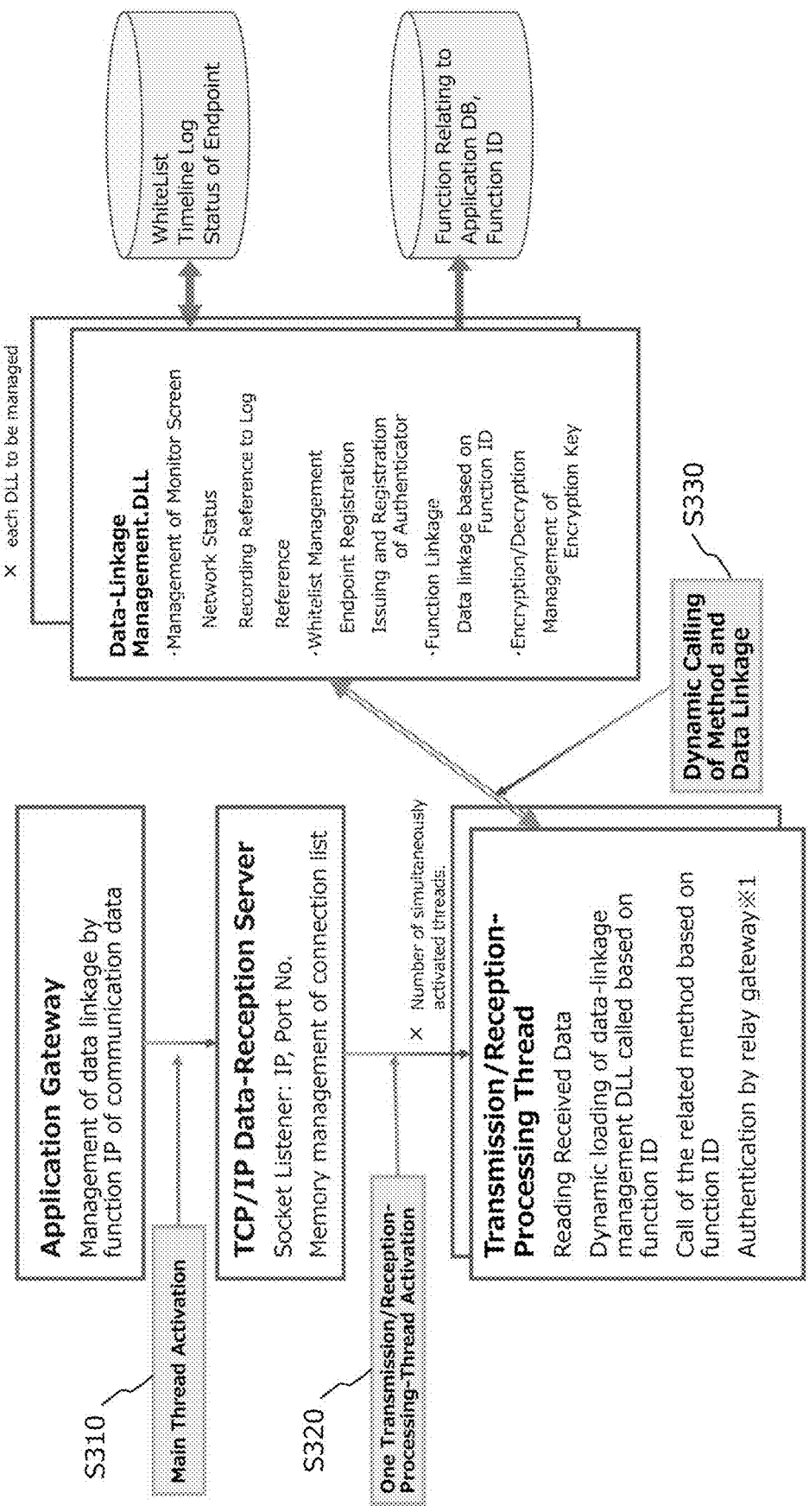

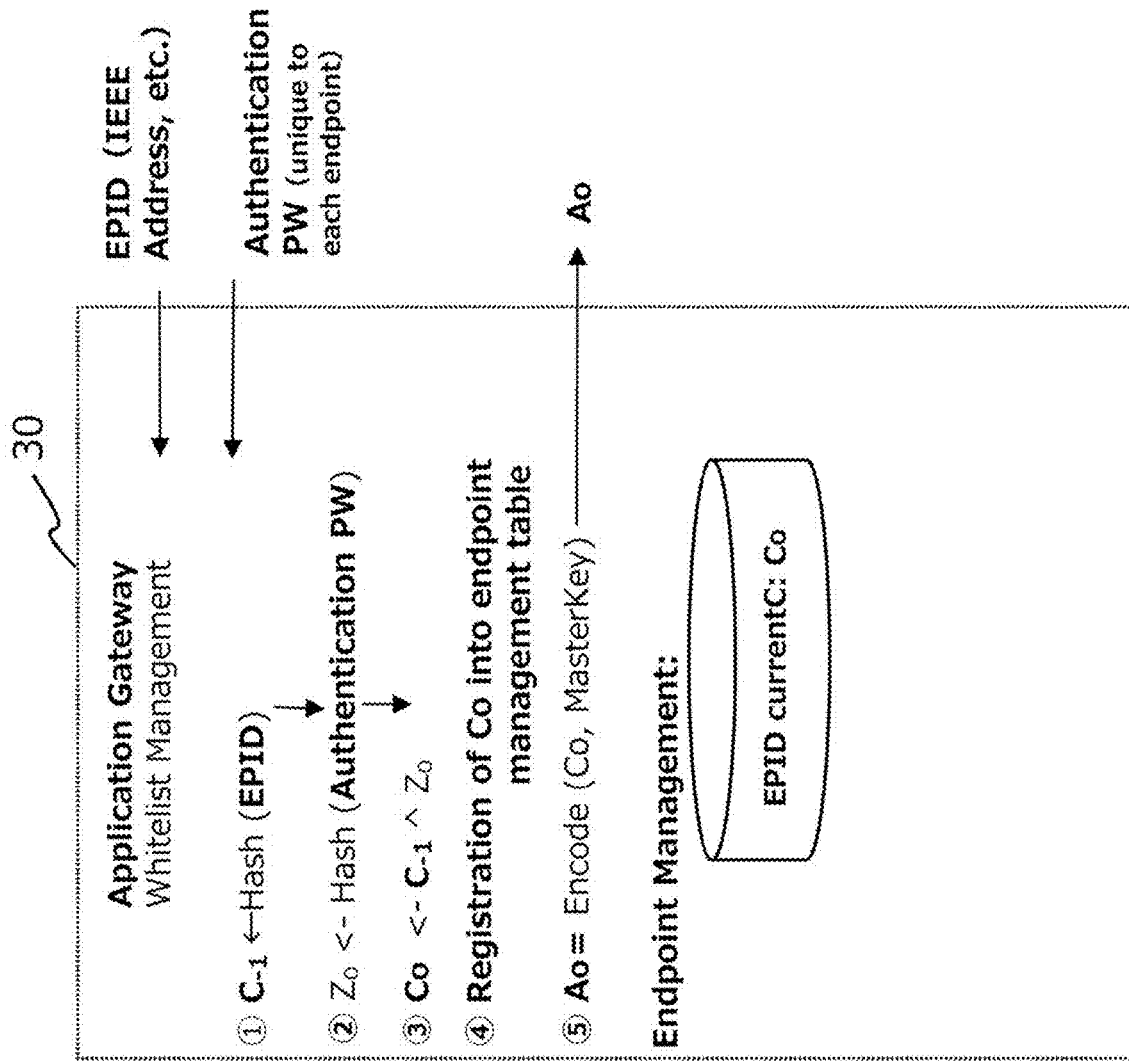
[Fig. 4]

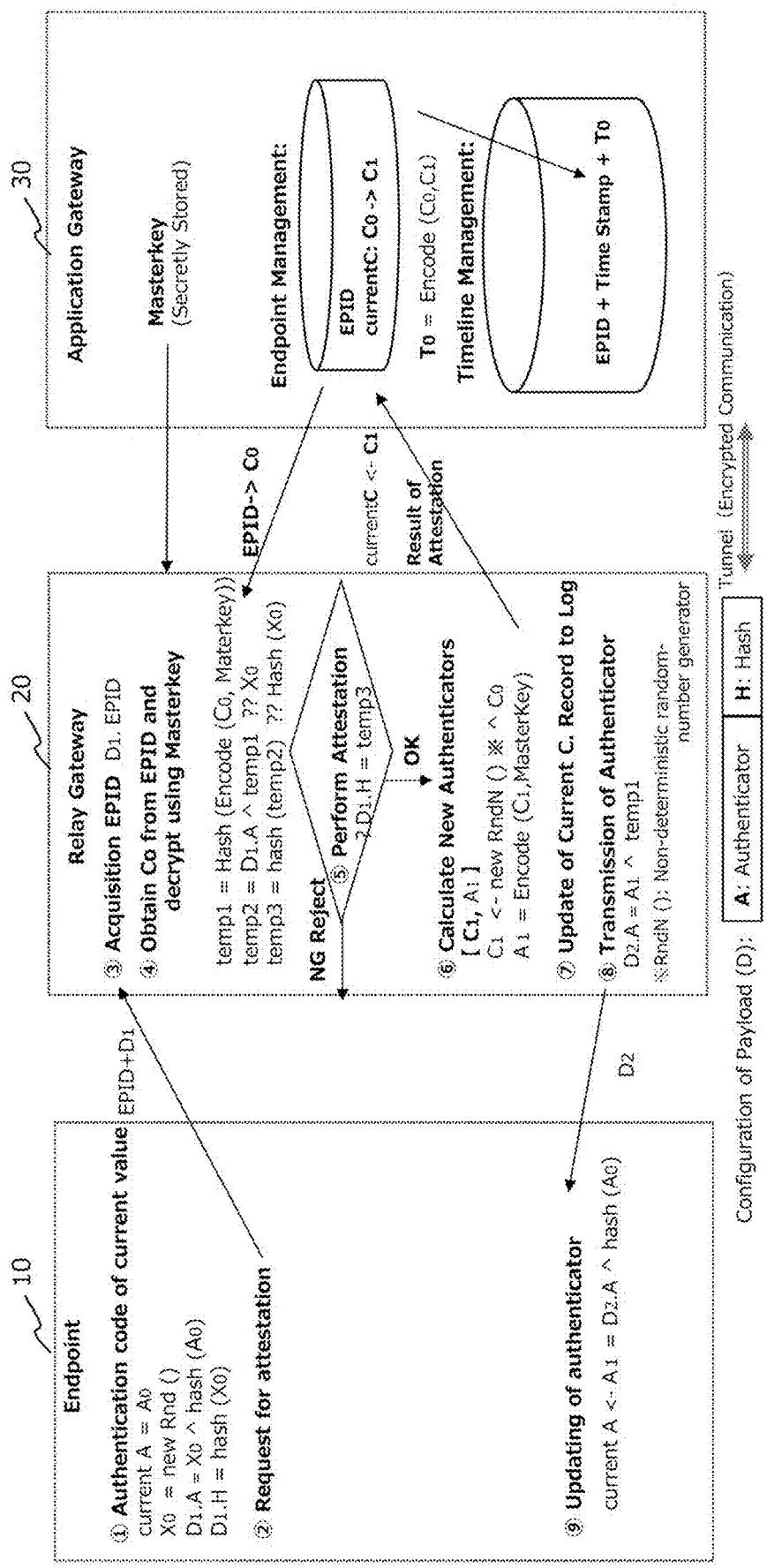

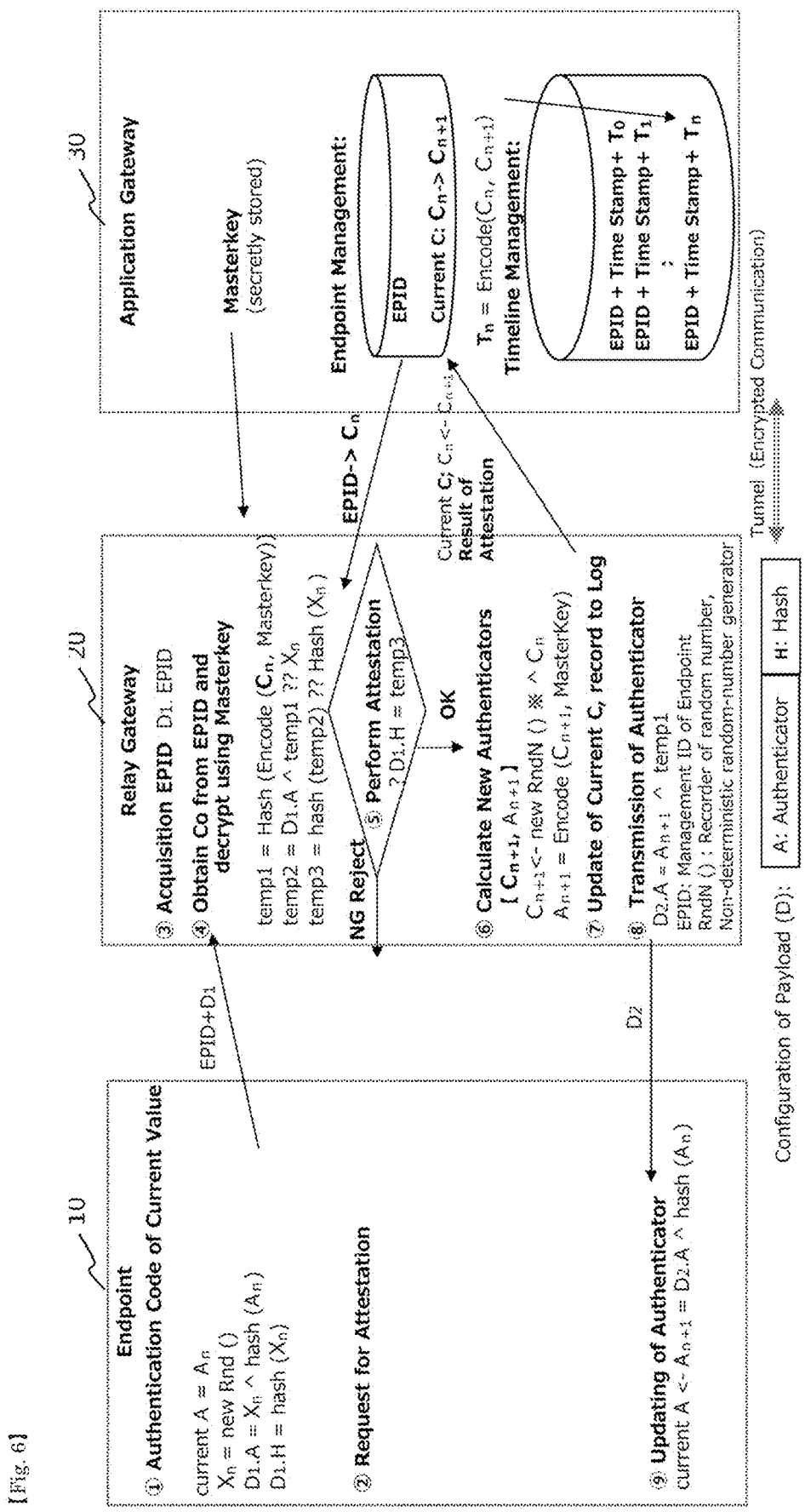

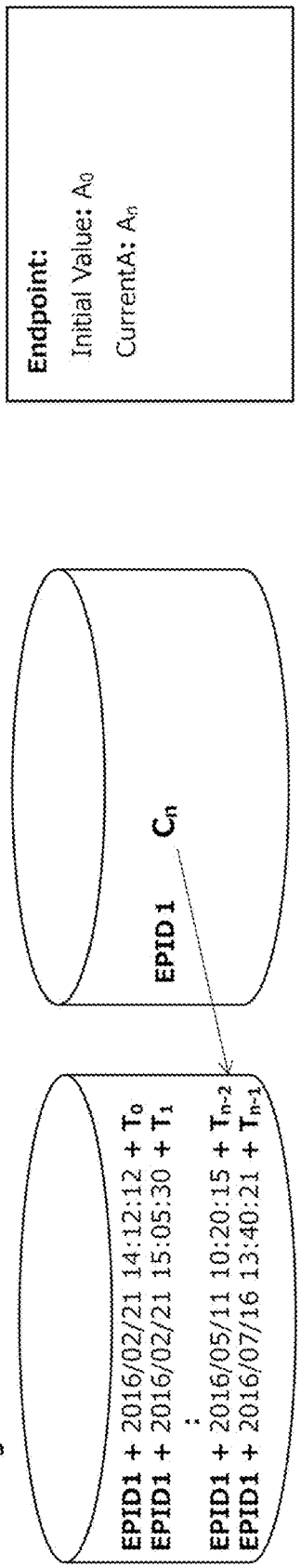

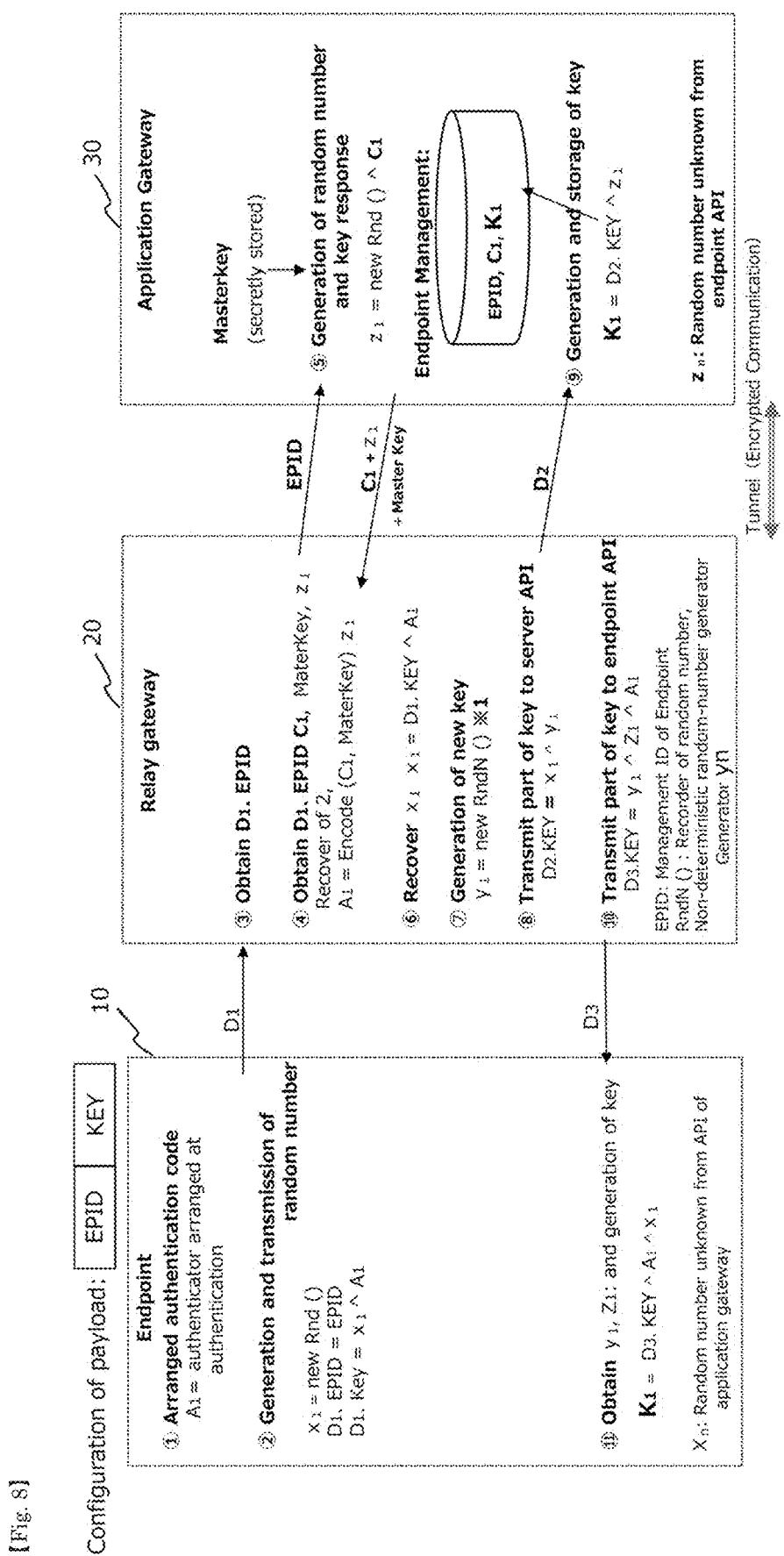

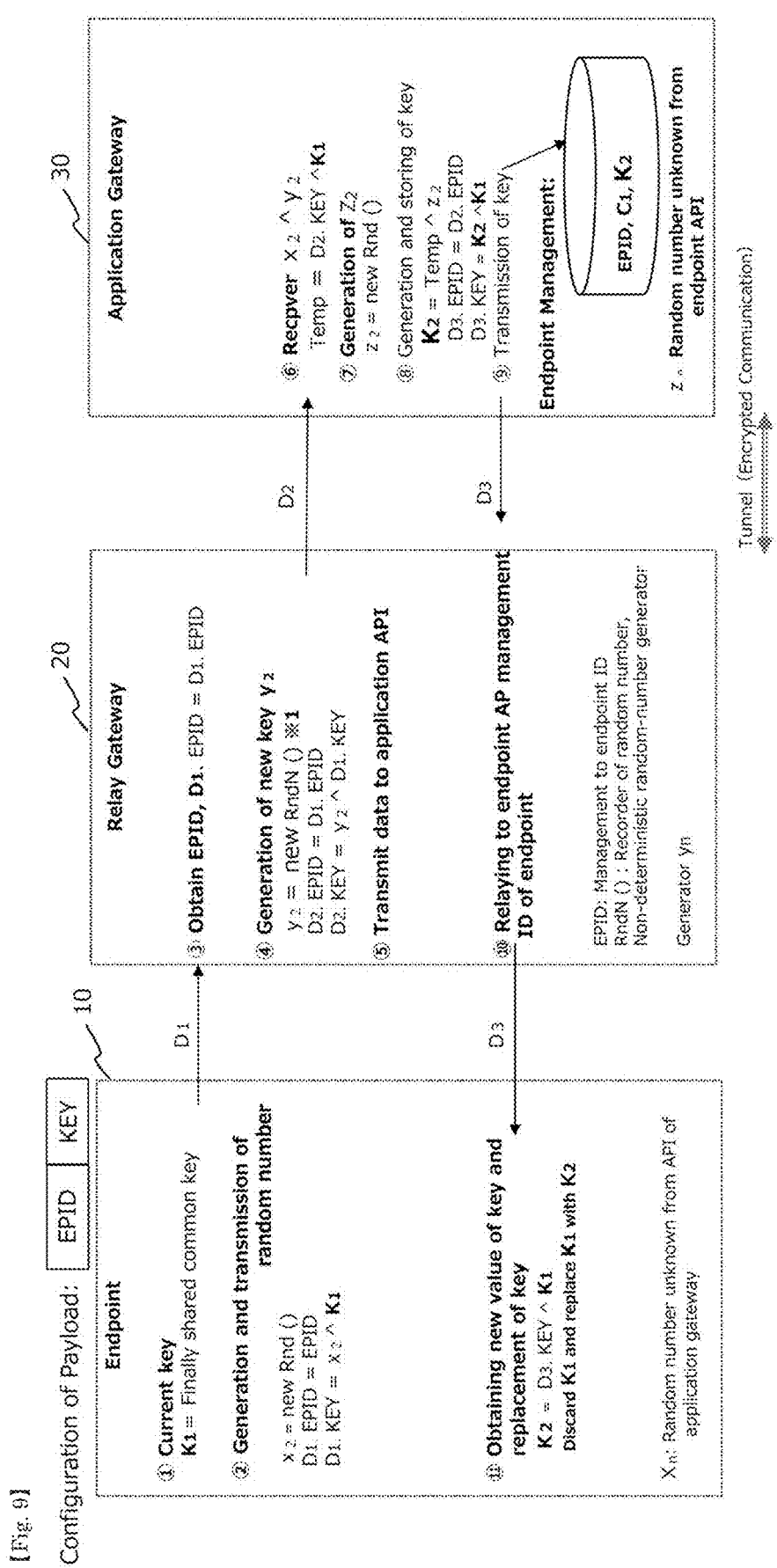

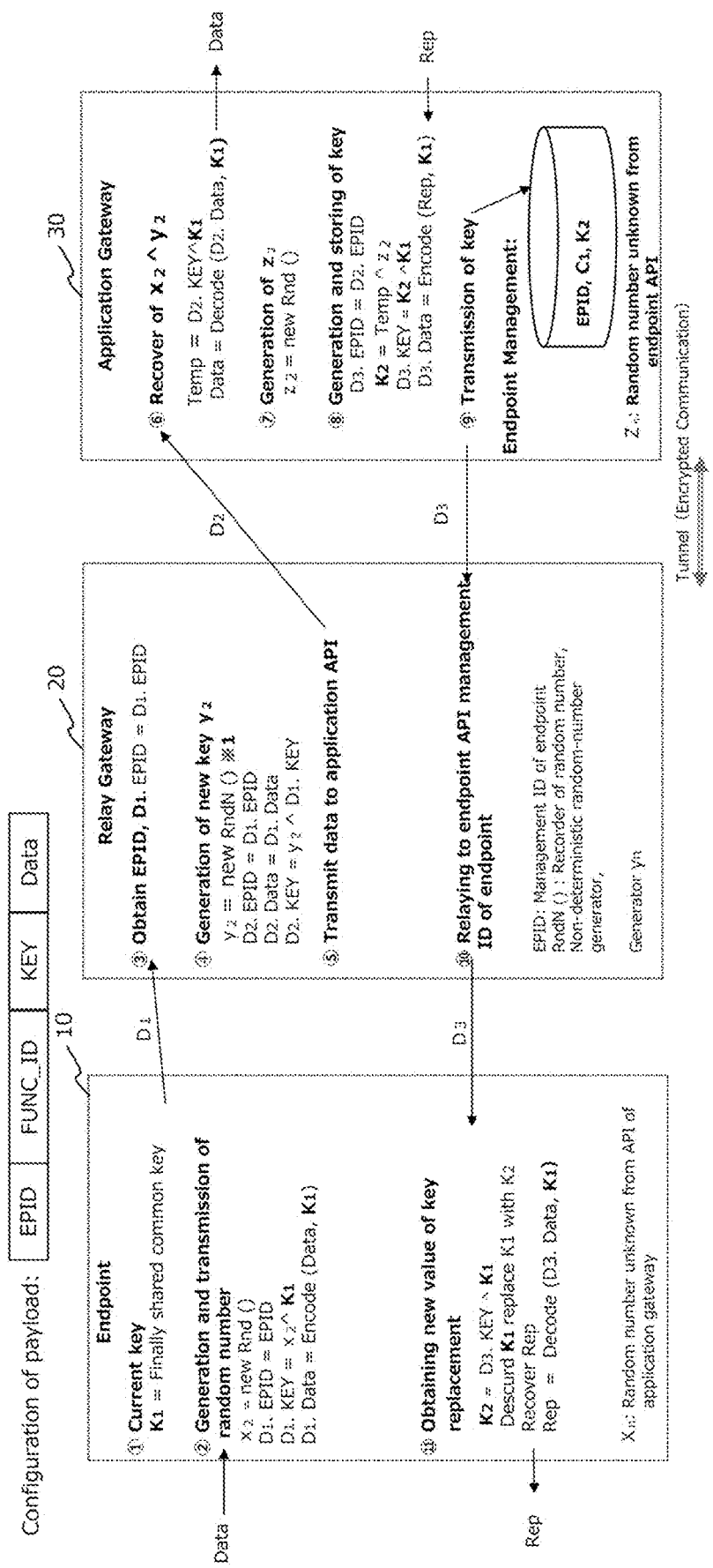
[Fig. 10]

SECURE NETWORK COMMUNICATION METHOD

BACKGROUND

The present invention relates to a secure-network-communication method, and more particularly, relates to a method that (1) registers, in a device-management whitelist, devices that capture data at a data-generation source, (2) manages authentication records at the startup of the devices by using timeline management of a lifecycle of the data, and (3) enables encrypted communications from the data-generation source to the entrance of a database.

Data dealt with as big data is acquired by a device, such as a sensor placed at a fixed position. When accumulating in a database the data acquired from such a data-generation source, multiple communication means, such as a gateway, a router, a file system, and the like are used between the data-generation source and the database in which the data is accumulated. In particular, in order to relay the data from a terminal device to the Internet, it is necessary to use gateways in which different communication means and security technologies are combined, in which, specifically, a wireless local-area network such as ZigBee®, Bluetooth®, or WiFi®, is combined with Internet communication by using the TCP.

Along with the development of the Internet, security for Internet communications has been established as SSL/TLS and the like. However, the devices used as data-generation sources are not directly connected to the Internet. But wireless limited-area networks such as ZigBee and Bluetooth, whose operating costs are low, and which are convenient in configuring the last tens of meters of a network, have been used to connect those devices to communication networks. However, stable electric power is not necessarily supplied in the area in which those devices are placed, or the area is not necessarily configured so that a stable operational environment for the devices is maintained. To stably operate devices placed in such an environment, the environment that surrounds such devices must provide conditions in which both the necessary power and the costs of operating the devices are as low as possible.

The security technologies that are provided for Internet security are not expected to be applied to such an area network. For example, there is a trade-off between key length and the performance of the LSI used for the communication devices in an area network. To implement in such an area network a key length of at least 128 bits, which is said to be necessary for sufficient security, is still a considerable challenge in view of the price requirements for the large-scale integration (LSI) used by the devices. Also, an encryption method such as SSL, also includes challenges, such as the procedure(s) for installing certificates in advance, and the computing power required for delivering keys. Due to the above-mentioned background, a networking and encryption method for a convenient and secure data-linkage system that connects a data-generation source to a database has been sought.

The length of data obtained from a sensor is generally short, and most of the data need not be processed in real time or encrypted. However, if a spoofing attack on the network is successful, the network system will be in disarray, causing considerable damage to the network. That is, although data encryption is necessary for network security, it is more important to provide the network with measures such as device authentication and anti-spoofing capabilities.

Patent Document 1 discloses a technique by which a first device and a second device share a common encryption key via a relay device. However, that document does not disclose authentication of devices that capture data at data-generation sources. Patent Document 2 discloses a technique in which an encryption key used at nodes in an ad hoc network is made common to each gateway, and if a key exchange is required, a new key is created at a gateway. This technique has the problem that it is not easy to manage individual key exchanges at nodes, because the keys are obtained by connecting a mobile terminal to a management server. Therefore, there is a need for a system that enables sensors, which are not expected to incorporate high-performance LSI or other functions to achieve high performance, to perform secured communications.

PRIOR-ART DOCUMENTS

Patent Documents

[Patent Document 1] Japan Patent No. 5039146.
[Patent Document 2] Japan Patent No. 5488716.

SUMMARY

Technical Problems

To overcome the problems in the conventional network communication methods mentioned above, the present invention provides a secure-network-communication method having features such that (1) the devices that capture data at data-generation sources are registered in advance in a whitelist as an endpoint of a network, the endpoint having a unique asymmetrical authenticator to manage the devices; (2) the endpoint is authenticated when it is started, and the records of authentication at the startup of the endpoint are managed using timeline management as a lifecycle that allows the time-series authentication to be traced back to the initial value of authentication; and (3) encrypted communication from the data-generation source to the database entrance is enabled regardless of the means of communication.

Solution to the Problem

A secure-network-communication method to achieve the aforementioned objectives, said method including an endpoint and a relay gateway connected with a first network, with an application gateway that is connected to the relay gateway via a second network, said method including: (1) initialization of each endpoint, whereby (a) the application gateway generates first and second authenticators that are asymmetrical to each other based on [1] an individual identifier that is unique to each endpoint and [2] an authentication password, (b) the second authenticator is stored in a management whitelist and is recorded in a timeline log, and (c) the first authenticator is stored in the endpoint; (2) authentication at the initialization of the endpoint, whereby the relay gateway (a) receives from the endpoint data that includes an individual identifier and the operation value obtained from the encrypted first authenticator, (b) determines the validity of the first authenticator, and (c) if the relay gateway determines that the first authenticator is valid, it [1] generates new asymmetric first and second authenticators using randomly generated numbers, and [2] transmits the authenticators to the application gateway, so that the application gateway updates the second authenticator in the whitelist, and [3] adds a record to the timeline log, and the endpoint updates and stores the first authenticator; and (3) arrangement of common keys, whereby (a) the relay gateway receives a first number randomly generated by the endpoint and a third number randomly generated by the application gateway, (b) the relay gateway generates part of an encryption key using [1] a second number randomly generated by the relay gateway, and [2] the first random number, and then transmits that part of the encryption key to the application gateway; (c) the relay gateway generates another part of an encryption key using the second random number and the third random number, and transmits said another part of the encryption key to the endpoint; (d) the application gateway generates an encryption key using the part of the encryption key and the third random number, and stores the generated encryption key in the whitelist; and (e) the endpoint generates an encryption key using said another part of the encryption key and the first random number, and then stores the generated encryption key.

In the secure-network-communication method, it is preferable that the relay gateway (1) receives from the endpoint data that includes the individual identifier and the operation value obtained from the encrypted first authenticator, (2) determines the validity of the first authenticator; and (3) if the relay gateway determines that the first authenticator is valid, it (a) generates new asymmetric first and second authenticators using newly randomly generated numbers, and (b) transmits the authenticators to the application gateway, so that the application gateway updates the second authenticator in the whitelist, and adds the record of the updating to the timeline log; and the endpoint then updates and stores the first authenticator.

The secure-network-communication method preferably further includes, on an as-needed basis, a key-exchange stage wherein the application gateway generates (1) a new encryption key for communication by using random numbers newly generated by each of the endpoint, the relay gateway, and the application gateway, and (2) transmits the new encryption key to the endpoint; and the endpoint and the application gateway respectively update the new encryption key.

In the secure-network-communication method, it is preferable that (1) the second authenticator at the initialization stage of the endpoint is the value of an XOR operation between the hash value of the individual identifier and the hash value of the authentication password, and (2) the first authenticator is the result obtained by encoding the second authenticator using a master key that is predetermined for authentication in the network system.

In the secure-network-communication method, it is preferable, in the authentication stage of the initialization of the endpoint, that (1) an operation value obtained from the encrypted first authenticator is the hash value of the encrypted first authenticator, (2) the data received from the endpoint further includes the hash value of a number randomly generated by the endpoint, and (3) the validity of the first authenticator is determined by comparing (a) the hash value of the result obtained by decoding the second authenticator extracted from the whitelist corresponding to the individual authenticator that is using the master key; (b) the operation value obtained from the hash value of the received encrypted first authenticator; and (c) the hash value of the received random number.

In the secure-network-communication method, it is preferable that a new second authenticator at the authentication stage of the initialization of the endpoint is the value of an XOR operation between the number randomly generated by the relay gateway and the second authenticator extracted from the whitelist corresponding to the individual authenticator, and a new first authenticator is obtained by encoding the new second authenticator using the master key.

In the secure-network-communication method, it is preferable that, when the common keys are being arranged, the part of the encryption key is the value of an XOR operation between the first random number and the second random number, the other part of the encryption key is the value of an XOR operation between the second random number and the third random number, and both the encryption key generated by the application gateway and the encryption key generated by the endpoint are values of an XOR operation between the first random number, the second random number, and the third random number.

The secure-network-communication method further includes a stage wherein a payload that includes data generated by or acquired by the endpoint is transmitted to the application gateway via the relay gateway, wherein (1) the payload is composed of four frames—an individual identifier, a function ID that represents a function, an encryption key, and data, (2) the value obtained by encoding the data to be transmitted using the latest encryption key is placed in the frame of the data, and the transmitted date is decoded by the application gateway using the latest encryption key, so as to be decrypted, and (3) the first network is a wireless local network and the second network is the Internet with TCP.

In the secure-network-communication method, it is preferable that (1) the timeline log is recorded by storing an individual identifier, a time stamp, and the value obtained by encoding the second authentication using the hash value of the authentication password in the memory for recording the timeline log, (2) the a record is added to the timeline log by additionally storing an individual identifier, a new time stamp, and the value obtained by encoding the latest second authentication using the hash value of the authentication password in the memory for recording the timeline log, (3) the initial value of the first authenticator can be obtained so that the value is obtained by encoding the second authenticator recorded in the timeline log using the hash value of the authentication password; (4) the obtained value is used to retrospectively decode each of the second authenticators; and (5) the finally obtained value of the second authentication is decoded using the master key, which results in the initial value of the first authenticator.

Advantageous Effects of the Invention

According to the secure-network-communication method of the present invention, the authenticator of the endpoint is updated using random numbers newly generated by a device independent of the endpoint and the application gateway that are at the two ends of the communication each time that authentication is performed, and the updated authenticator is stored at both the endpoint and the gateway, respectively, as different authenticators. Also, by using a timeline log, the history of updating can be traced back to the initial value of the authenticator, whereby this communication method provides a communication environment in which it is extremely difficult for a third party to intervene in the communication by a spoofing attack. Also, according to the secure-network-communication method of the present invention, because the endpoint is managed by the whitelist, there is no concern that the content of the list will continue to increase each time there occurs an event to be recorded, which eliminates unnecessary increases in the load required for managing the application gateway, unlike what occurs in the case of a blacklist.

BRIEF DESCRIPTION OF THE DRAWINGS

FIG. 1 is a diagram schematically showing the network components and the data linkage to which is applied a secure-network-communication method according to an embodiment of the present invention.

FIG. 2 is a diagram showing the functional configuration of an endpoint, a relay gateway, and an application gateway according to the embodiment of the present invention.

FIG. 3 is a diagram illustrating a configuration example of applications relating to a gateway according to the embodiment of the present invention.

FIG. 4 is a diagram showing a method of initializing an endpoint in the secure-network-communication method according to the embodiment of the present invention.

FIG. 5 is a diagram showing an authentication method at the time of initialization of the endpoint in the secure-network-communication method according to the embodiment of the present invention.

FIG. 6 is a diagram showing an authentication method when attestation of the endpoint is made in the secure-network-communication method according to the embodiment of the present invention.

FIG. 7 is a diagram illustrating a timeline-management method according to the embodiment of the present invention.

FIG. 8 is a diagram showing a method for arranging common encryption keys (common keys) used for transmitting and receiving data between the starting point and the ending point of data linkage.

FIG. 9 is a diagram showing a method of exchanging keys for encryption communication between the starting point and the ending point of the data linkage via a relay gateway according to the embodiment of the present invention.

FIG. 10 is a diagram showing a method of exchanging keys and of transmitting and receiving data, for encryption communication between the starting point and the ending point of the data linkage via a relay gateway according to the embodiment of the present invention

DETAILED DESCRIPTION

Next, a specific example for implementing the secure-network-communication method according to the present invention will be described with reference to the drawings. FIG. 1 is a diagram schematically showing the network components and data linkage to which is applied the secure-network-communication method according to an embodiment of the present invention.

As shown in FIG. 1, a secure network's components include an endpoint 10, a relay gateway 20, and an application gateway 30. The endpoint 10 may be any of a variety of sensors for detecting temperatures, pressures, and the like, or it may be a terminal device that manages those sensors, or a professional-use handy terminal operated by a person, or a portable device such as a smartphone. Here, the endpoint is a general term referring to equipment that captures data at a data-generating source, i.e., equipment that operates as a starting point of data transmission. The endpoint 10 includes an endpoint API 11, which is an interface for managing authenticators and executing data encryption/decryption for secure communication.

The application gateway 30 receives a variety of data from the endpoint and then delivers the data to an associate application that ultimately processes the data. Here, the associate application is, for example, software that provides the distribution of temperatures in a specific area, or that predicts temperature changes based on time-series variations of temperatures using data captured at an endpoint. Thus, the associate application is software that creates and provides practical information using data captured at the endpoint.

The application gateway 30 includes an application API 31, which is an interface used in executing data transfer, encryption/decryption, random-number generation, and the like. In addition to these tasks, the application API 31 also manages a whitelist that is provided for network monitoring and endpoint management. The application API 31 also (1) keeps in a log a history of updates of an authenticator that is used for authentication during communication, (2) performs timeline management in which any illegal access(es) can be detected, and (3) searches log information. Information managed by the application API 31 is stored in the network-information-management memory 33. The aforementioned associate application to which the data is finally delivered via application API 31 is stored in an associate application DB 32.

The application gateway 30, the application API 31, the network-information-management memory 33, and the associate application DB 32 may be embodied as one data center, and the network-information-management memory 33 and the associate application DB 32 may be configured as external memory directly connected to the application gateway 30.

The relay gateway 20 receives data from the endpoint 10 and transfers the data to the application gateway 30. The endpoint 10 and the relay gateway 20 are connected together by a personal area network (PAN) 40. Gigbee, Bluetooth, Wifi, or the like can be used as the communication method, and each of these may be used properly according to the content of the data and in consideration of the characteristics of each type of wireless communication. Further, as shown in FIG. 1, multiple nodes may be provided between the endpoint 10 and the relay gateway 20.

The relay gateway 20 and the application gateway 30 are connected together via the Internet 50. Regarding security, the Internet is already provided with a communications environment based on encrypted communication such as SSL/TSL, and therefore a description of the safety of the Internet 50 is omitted herein on the premise that secure communications between the relay gateway 20 and the application gateway 30 is established based on such existing communications technology.

The data captured at the endpoint 10 is subject to predetermined processing and is linked with a function that includes content indicating the processing to which the data is related. That function is located in front of the starting point and at the rear of the ending point for communication for data linkage. The endpoint 10, by linking with a function ID that indicates the function of the data, can process the data to be transmitted. That function becomes a unit of logical data linkage between the endpoint API 11 and the application API 31, and in both the endpoint API 11 and the application API 31, that function is handled as a unit for independent processing.

The function at the endpoint 10 operates as a unit for digitizing and sending data generated by sensors and the like, and the endpoint API 11 adds a function ID to the data and then transmits the data. The function at the application API 31 receives, from a sensor or the like, data along with a function ID for storing the data in a database. The function dynamically connects a dynamic-link library (DLL) that is associated with a function ID to the data, calls a method in the DLL associated with the function ID, and connects the method to the database associated with the method. The procedure (function) described in the method is an entity that is called lastly and that is handled by the API 31.

The secure-network-communication method according to the present invention provides, in a network that includes the aforementioned components, the following features: (1) the application gateway generates first and second authenticators that are asymmetrical to each other, based on the combination of an individual identifier that is unique to each endpoint and an authentication password; the second authenticator is stored in the management whitelist, and the first authenticator is stored in the endpoint at the initializing stage of each endpoint; (2) each time that the endpoint is authenticated, there are updated (a) authenticators that are asymmetrical to each other are generated using newly randomly generated numbers, and (b) the whitelist, and the generated authenticators are recorded in the timeline log so as to manage the uniqueness of the authenticators in chronological order; (3) as regards data transmission, encryption keys generated by the random numbers, which are generated by each of the endpoint, the relay gateway, and the application gateway, are exchanged between the endpoint and the application gateway as a shared encryption key that will be used in the subsequent communication. These features enable spoofing to be prevented, and make possible communications that require only a relatively small load factor.

FIG. 2 is a diagram showing, according to the embodiment of the present invention, the functional configuration of an endpoint, a relay gateway, and an application gateway. FIG. 2 also shows the roles and content of each component in regard to data communications.

As shown in FIG. 2, the application gateway includes the following roles: communication, session management, application management, application programming interface (API), and function. The communication role involves managing the TCP/IP for Internet communications with the relay gateway, which is on the other side of the application gateway. Session management involves managing communication sessions whereby data is received from the endpoint via the relay gateway. Application management involves relaying the received data to the application to which the data is to be delivered. The API decodes the received data, refers to the function ID that has been added to the data, connects the DLL associated with the function ID to the received data, and delivers the data to the relevant associate application. Because such data delivery is performed for each specific function, as shown in FIG. 2, the function includes multiple specific functions corresponding to the number of the specific functions (function 1, function 2, . . . ).

The relay gateway includes the following roles: (1) communication and security management for Internet communications with the application gateway, and (2) (a) communication, through a PAN, with the endpoint, (b) session management, and (c) security management. A data bus exists between said roles (1) and (2). Communication with the endpoint is managed so as to conform to the standard of each wireless communication method (ZigBee, Bluetooth, WiFi, etc.). Security management includes relaying data and authenticating endpoints in regard to security management on the endpoint side. Security management also generates random numbers needed to generate and exchange encryption keys for transmission and reception of data.

The endpoint includes the roles of communication with the relay gateway, communication management, application programming interface (API), and function. The endpoint is the starting point of data transmission, and the API encrypts data captured at data sources. The API also generates ciphers necessary for generating and updating encryption keys used for subsequent communication, and decodes a part of the encrypted encryption keys transmitted from the application gateway. The data handled by the endpoint accompanies a specific function, and if there are multiple specific functions, the data accompanies multiple specific functions corresponding to the number of the specific functions (function 1, function 2, . . . ). The above roles of the API can be allocated to the multiple respective specific functions, and the specific function of the endpoint and the specific function of the application gateway can be associated one-to-one, whereby data linkage can be performed at each function ID.

FIG. 3 is a diagram illustrating a configuration example of applications relating to a gateway according to the embodiment of the present invention. The application gateway 30 activates the main thread in order to perform connection and reception processing while managing the data linkage of the communication data, and launches the application that serves as the TCP/IP data-reception server (S310). In the case of a listener, a listener socket is created so that the TCP port is specified, whereby the TCP connection to the specified IP address is processed.

Next, one transmission/reception processing thread is activated to read data (S320). In the transmission/reception processing thread, the following is performed: reading of received data, dynamic loading of a data-linkage-management DLL that is associated with the function ID added to the data, and calling of the related method based on the function ID (S330).

The data-linkage-management DLL is a library used for data-linkage management and for such processing as controlling a management-monitor screen, whitelist management, function linkage, and encryption/decryption. Information concerning security such as the whitelist processed by the data linkage management.DLL, the timeline log, and the state of the endpoint, is stored in the network-information-management memory. That information is read from or written into the network-information-management memory in response to the content of the processing performed, so that the latest information is stored in the network-information-management memory. Also, the data received from the endpoint is assigned to the procedure (a function) described in the method to be called based on the function ID, and the finally obtained data is stored in the corresponding database of the associate application DB.

Next, a specific processing procedure of the secure-network-communication method according to the embodiment of the present invention will be described with reference to FIGS. 4-10. FIG. 4 is a diagram showing a method of initializing an endpoint in the secure-network-communication method according to the embodiment of the present invention. To initialize the endpoint, the application gateway issues, initial asymmetric authenticators, that is, initial values ($C_0$, $A_0$) of the authenticators used for authentication at the time of initialization of the endpoint, and then stores them in the whitelist.

At this stage, the application gateway generates first and second authenticators that are asymmetrical to each other based on an individual identifier and an authentication password unique to each endpoint, so that the second authenticator is stored in the whitelist for management, and the first authenticator is stored at the endpoint. As shown in FIG. 4, upon initialization of an endpoint that is newly installed, an Enhanced Privacy Identification (EPID), which is an identifier unique to each endpoint, and an authentication password to permit the application gateway to authenticate the EPID, are input. The individual identifier EPID preferably is an identifier that is native to the endpoint and that represents the uniqueness of each EPID, so that, for example, an IEEE802 address can be used as the EPID. Also, because the authentication password is preferably unique to each EPID, the password is to be set in advance so as not to be the same as the other endpoint's authentication password.

The application gateway uses the application API to perform the following processing. First, the hash value of the inputted individual identifier EPID is obtained and assigned to $C_{-1}$, which represents the previous stage for generating the initial value $C_0$ of the second authenticator among the asymmetric authenticators. Next, a hash value of the authentication password is obtained and the obtained value is set to $Z_0$. By passing the authentication password through the hash function in this manner, the authentication password is used after it has been converted to the form from which the original authentication password cannot be guessed. Here, the digest value generated by each hash function to which the individual identifier EPID and the authentication password is passed is set to have the same length, for example, 128 bits.

An XOR operation is performed between $C_{-1}$ and $Z_0$, and the obtained result is set to be the initial value $C_0$ of the second authenticator. The initial value $C_0$ of the second authenticator is registered in the whitelist of an endpoint-management table along with the individual identifier EPID. The endpoint-management table is created and managed in the network-information-management memory.

Finally, the initial value $C_0$ of the second authenticator is encoded using a master key that is predetermined for authentication in the network system, and, as a result, the initial value $A_0$ of the first authenticator is obtained. The initial value $A_0$ of this first authenticator is output and stored in the memory of the endpoint. In this case, an electrically erasable programmable read-only memory (EEPROM), a subscriber identity module (SIM), or the like that does not lose data when power is turned off is used as the memory. Thus, the initial value of the authenticator of the endpoint is saved and maintained, so that even if power is unexpectedly shut off, the authentication at the initialization of the endpoint can be performed when the power is again turned on.

The functions used for the encoding process are as follows:

$$Y=\text{Encode}(X,PW) \quad (1)$$

$$X=\text{Decode}(Y,PW) \quad (2)$$

where PW is a password. In these functions, if the result obtained by encoding a value using a password is decoded by using the same password, the original value is recovered.

As described above, based on the initial value $C_0$ of one authenticator, encoding processing is performed using the master key as a password, whereby an initial value $A_0$ of the authenticator that is asymmetric to the original value $C_0$ is generated. In the initialization stage of the endpoint, among the generated initial values of asymmetric authenticators, the initial value $A_0$ of the first authenticator is stored at the endpoint, and the initial value $C_0$ of the second authenticator is stored in the application gateway. Also, the authentication password itself must not be left in the database of the application gateway. Thus, by changing the form of related information and storing the related information separately, the security of network communication can be improved.

FIG. 5 is a diagram showing, in the secure-network-communication method according to the embodiment of the present invention, an authentication method in which at the time of initialization of the endpoint is shown a flow of authentication when a new endpoint is added to the relay gateway. At this stage, the relay gateway receives from the endpoint the data that includes an individual identifier and an operation value obtained based on the encrypted first authenticator, and determines the validity of the first authenticator. If the relay gateway determines that the first authenticator is valid, it generates new asymmetric first and second authenticators using randomly generated numbers, and transmits the authenticators to the application gateway. The application gateway updates the second authenticator in the whitelist, and adds the record to the timeline log, and the endpoint then updates the first authenticator and stores it.

Here it is premised that the initialization stage of the endpoint described with reference to FIG. 4 has been completed. The initial value $A_0$ of the first authenticator is stored in the nonvolatile memory of the endpoint, and the EPID that is a unique individual identifier of the endpoint and the initial value $C_0$ of the second authenticator are stored in the endpoint-management table of the application gateway. Therefore, currentA, representing the present authenticator in the processing of the endpoint, is the initial value $A_0$, and currentC, representing the present authenticator, is the initial value $C_0$ in the endpoint-management table. Also, at this stage, communication between the three components, i.e., the endpoint, the relay gateway, and the application gateway, is performed, and encrypted communication through the Internet is supposed to be established in the communication between the relay gateway and the application gateway.

As shown in FIG. 5, a new random number $X_0$ is first generated at the endpoint. A pseudo-random-number generator may be used to generate this random number. The payload (D1) of the data that is transmitted from the endpoint to the relay gateway in the authentication stage of the initialization of the endpoint is composed of an authenticator (A) and a hash (H). At the endpoint, by using the random number $X_0$ generated as mentioned above, an XOR operation is performed between the hash value of the initial value $A_0$ of the first authenticator and the random number $X_0$, and the result of the operation is assigned to the value (D1.A). Subsequently, a hash value of the random number $X_0$ is obtained and assigned to the value of the hash (H) of the payload (D1.H). The endpoint transmits the payload (D1) together with the individual identifier EPID to the relay gateway and requests that the relay gateway attest the payload (D1).

Upon receiving the payload (D1) and the individual authenticator EPID, the relay gateway, based on the EPID, obtains from the application gateway the master key and the initial value $C_0$ of the second authenticator. Then, the relay gateway obtains a hash value (operation value 1; temp 1) that is a result obtained by encoding the initial value $C_0$ of the second authenticator using the master key, and an XOR operation is performed between D1.A, the value of the authenticator A of the payload received from the endpoint, and the operation value 1, so as to obtain operation value 2; temp 2.

In this processing, encoding the initial value $C_0$ of the second authenticator using the master key is the same as obtaining the initial value $A_0$ of the first authenticator as described with reference to FIG. 4, and the operation value 1 corresponds to the hash value of the initial value $A_0$ of the first authenticator. The operation value 2 is the value obtained so that an XOR operation is performed between the hash value of the initial value $A_0$ of the first authenticator and the random number $X_0$, and further so that an XOR operation is performed between the result of that XOR operation and the hash value of the initial value $A_0$ of the first authenticator. Therefore, if the current authenticator $A_0$ at the endpoint has not been tampered with, the operation value 2 is effectively the same as the random number $X_0$.

The relay gateway further obtains the hash value (operation value 3; temp 3) of the operation value 2, and performs an attestation by comparing the hash H of the D1.H of the payload received from the endpoint, with the operation value 3. If the current authenticator $A_0$ of the endpoint has not been tampered with, both the hash H of the D1.H and the operation value 3 become the hash value of the random number $X_0$, and the attestation is successful. If the current authenticator $A_0$ is tampered with, the operation value 2 does not become the same as the random number $X_0$, and the attestation is not successful.

If this attestation is successful, the relay gateway generates a new random number $Y_0$, and performs an XOR operation between the random number $Y_0$ and the initial value $C_0$ of the second authenticator, so that the relay gateway generates a new second authenticator $C_1$. Furthermore, the relay gateway encodes the new second authenticator $C_1$ using the master key to generate a new first authenticator $A_1$. The random number $Y_0$ generated by the relay gateway is generated using a non-deterministic random-number generator. Therefore, the random number $Y_0$ is an unpredictable value.

The relay gateway finally transmits a new second authenticator C1 to the application gateway, and performs an XOR operation between the new first authenticator $A_1$ and the aforementioned operation value 1 so as to transmit the result of the XOR operation to the endpoint. This can prevent the new first authenticator A1 from being exposed while it is on the communication path.

Upon receiving the new second authenticator $C_1$ from the relay gateway, the application gateway changes the currentC representing the current authenticator in the endpoint-management table from the initial value $C_0$ to the new second authenticator $C_1$, so as to update and manage the whitelist. At this time, the application gateway encodes the initial value $C_0$ of the second authenticator using the second authenticator $C_1$, and records in the timeline log the result of this encoding as the initial value $T_0$ of the timeline ID, along with the individual identifier EPID, and the time stamp.

The endpoint that has received from the relay gateway the result of the XOR operation between the new first authenticator $A_1$ and the operation value 1 performs an XOR operation between the received value and the hash value of the initial value $A_0$ of the first authenticator stored at the endpoint. As previously explained, because the operation value 1 corresponds to the obtained hash value of the initial value $A_0$ of the first authenticator, the only result of this operation is obtaining a new first authenticator $A_1$. The endpoint replaces the initial value $A_0$ that represents the current authenticator and that is recorded in currentA with the newly obtained first authenticator $A_1$.

FIG. 6 is a diagram showing an authentication method when an attestation at the endpoint is made in the secure-network-communication method according to the embodiment of the present invention. The attestation described here relates either to the attestation made at the time of restarting the endpoint or to an attestation made at odd intervals. The flow of authentication made in such cases will now be described. At this stage, the relay gateway receives from the endpoint the data that includes an individual identifier and an operation value obtained from the latest encrypted first authenticator, and determines the validity of the latest first authenticator. If the relay gateway determines that the latest first authenticator is valid, the relay gateway (1) generates new asymmetric first and second authenticators by using a newly generated random number, (2) transmits the new first authenticator to the endpoint, and (3) transmits the new second authenticator to the application gateway. The application gateway updates the second authenticator in the whitelist and adds the record to the timeline log, and the endpoint updates the first authenticator, and then stores the updated first authenticator.

The basic flow is the same as that of the authentication made at the initialization of the endpoint described with reference to FIG. 5. In order to generalize the explanation, a natural number n is used as a suffix in the following. That is, as a premise of authentication of the attestation, the latest first authenticator $A_n$ is stored in (1) currentA, which represents the current authenticator at the endpoint, and (2) the endpoint-management table, and the latest second authenticator $C_n$ is stored in currentC, which represents the current authenticator. Also, each time that an authenticator is updated, an individual identifier EPID, a time stamp, and a timeline ID are added to, and recorded in, the timeline log. In the latest timeline log is recorded the timeline ID Tag, which is obtained by encoding the second authenticator $C_{n-1}$ by using the latest second authenticator $C_n$, with the second authenticator $C_{n-1}$ being the second authenticator before the latest second authenticator $C_n$ is obtained.

If attestation of the endpoint is required, the endpoint generates a new random number $X_n$, and there is obtained a value of an XOR operation between the current hash value of the first authenticator $A_n$ and the random number $X_n$. The XOR operation value thus obtained is assigned to D1.A of the payload (D1), and the hash value of the random number $X_n$ is assigned to D1.H of the payload (D1), so that the payload (D1) is transmitted to the relay gateway along with the EPID to request an attestation. The configuration of the payload (D1) is the same as that used for authentication at the initialization of the endpoint.

The relay gateway acquires from the application gateway the master key and the current $C_n$ of the second authenticator, and obtains operation values 1-3 in the same way as described with reference to FIG. 5, so that the relay gateway makes an attestation using the value of D1.H and the operation value 3. If the attestation is successful, the relay gateway generates a new random number $Y_n$, and performs an XOR operation between the random number $Y_n$ and the value $C_n$ of the second authenticator, so that the relay gateway generates new $C_{n+1}$ of the second authenticator. Furthermore, the relay gateway encodes the new second authenticator $C_{n+1}$ using the master key to generate a new first authenticator $A_{n+1}$.

The application gateway receives the new second authenticator $C_{n+1}$, which then replaces the current authenticator $C_n$ in the endpoint-management table. Further, the application gateway encodes the current authenticator $C_n$ using the new second authenticator $C_{n+1}$, and records in the timeline log the result of the encoding as $T_n$, a new timeline ID, along with the individual identifier EPID and the time stamp.

The endpoint (1) receives a new first authenticator $A_{n+1}$, which is obtained by an XOR operation between the new first authenticator $A_{n+1}$ and the operation value 1 performed by the relay gateway, and (2) recovers the new first authenticator $A_{n+1}$ by performing an XOR operation between the received XOR operation value of the new first authenticator $A_{n+1}$ and the hash value of the current first authenticator $A_n$, so that the endpoint updates the current first authenticator. Even in the authentication made at an attestation, because an authenticator encrypted by a hash function is transmitted and received during the communication between the endpoint and the relay gateway, the original authenticator is never exposed during the communication.

FIG. 7 is a diagram illustrating a timeline-management method according to the embodiment of the present invention. As described with reference to FIGS. 5 and 6, each time that an authentication at the relay gateway is successful, a new authenticator is created. Along with this process, the authenticator of the endpoint-management table is updated, and a record relating to the authentication is added to the timeline log.

The second authenticator stored in the endpoint-management table is only the current value of the second authenticator associated with the individual identifier EPID of the endpoint, and the second authenticator before having been updated does not remain in the table. However, all the information updated from the initial value of the timeline ID remains in the timeline log. The timeline ID is a value obtained by using a new updated second authenticator to encode the second authenticator before it has been updated. Thus, for example, suppose the new second authenticator is $C_n$, then the second authenticator before it has been updated is $C_{n-1}$, so that $T_{n-1}$, the time line ID at the time of updating, is represented as follows:

$$T_{n-1} = \text{Encode}(C_{n-1}, C_n) \quad (3)$$

As a result of this updating, a new second authenticator $C_n$ is stored in the endpoint-management table, and $T_{n-1}$, the timeline ID at the time of updating, is recorded at the end of the timeline log.

The function used for encoding has the property that, as expressed by the above-mentioned formulas (1) and (2), if the encoded value is decoded by using the value used for encoding, the original value is recovered. Therefore, if the timeline ID, $T_{n-1}$, is decoded by the second authenticator $C_n$ stored in the endpoint-management table, the second authenticator $C_{n-1}$ before updating can be obtained. Similarly, if $T_{n-2}$, which is the timeline ID immediately preceding $T_{n-1}$, is decoded by the second authenticator $C_{n-1}$, the second authenticator $C_{n-2}$ that immediately precedes $C_{n-1}$ can be obtained. In this manner, by tracking back the timeline ID one by one, the initial value $C_0$ of the second authenticator can be obtained. If the initial value $C_0$ of the second authenticator is found, by encoding this value with the master key, the initial value $A_0$ of the first authenticator can be obtained. By matching this obtained value $A_0$ with the initial value $A_0$ of the first authenticator stored in the nonvolatile memory of the endpoint as needed, the validity of the endpoint can be confirmed.

FIG. 8 is a diagram showing a method, according to the embodiment of the present invention, for arranging common encryption keys (common keys) used for transmitting and receiving data between the starting point and the ending point of data linkage, that is, between the endpoint and the application gateway via the relay gateway. At this stage, (1) the relay gateway receives the first number randomly generated by the endpoint and the third number randomly generated by the application gateway; (2) the relay gateway generates part of the encryption key using the second number randomly generated by the relay gateway and the first random number, and transmits the part of the encryption key to the application gateway; (3) the relay gateway generates the other part of the encryption key by using the second random number and the third random number, and transmits the other part of the encryption key to the endpoint; (4) the application gateway generates an encryption key using the part of the encryption key generated by the relay gateway and the third random number, and stores the generated encryption key in the whitelist; and (5) the endpoint generates an encryption key by using the other part of the encryption key and the first random number, and stores the newly generated encryption key.

As a premise, the initialization of the endpoint and the authentication at the time of initialization described with reference to FIGS. 4 and 5 have been completed. That is, the current first authenticator at the endpoint is $A_1$, and the current second authenticator recorded in the endpoint-management table is $C_1$. At the stage of arranging the common key, a new random number $x_1$ is generated at the endpoint. The payload (D1) of the data transmitted from the endpoint at the stage of arranging the common key is composed of an identifier EPID and a key KEY. The endpoint assigns the individual identifier EPID of the endpoint to D1. EPID, the value of the identifier of the payload, and assigns the result of an XOR operation between the generated random number $x_1$ and the current first authenticator $A_1$ to D1.KEY, the value of the key of the payload, so that the endpoint transmits D1 to the relay gateway.

The relay gateway recovers the individual identifier EPID, and transmits it to the application gateway, which extracts from the endpoint-management table the current second authenticator $C_1$ corresponding to the individual identifier EPID, and performs an XOR operation between the current second authenticator $C_1$ and newly generated random number, so that the application gateway generates $z_1$, part of the common key. The $z_1$ part of the common key is transmitted to the relay gateway along with the master key and the current second authenticator $C_1$.

The relay gateway encodes the received current second authenticator $C_1$ by using the master key, and obtains the current first authenticator $A_1$ corresponding to the current second authenticator $C_1$, and next performs an XOR operation between D1.KEY, the value of the key of the payload received from the endpoint, and the current first authenticator $A_1$ obtained as specified above. Because D1.KEY is the result of the XOR operation between the random number $x_1$ and the current first authenticator $A_1$, the random number $x_1$ can be recovered by this operation.

Further, the relay gateway generates a new random number $y_1$. Thus, all three random numbers $x_1$, $y_1$, and $z_1$, which constitute the encryption key, are obtained. In the relay gateway, one part of each of two different encryption keys is generated while the relay gateway dose not bring the encryption key to completion, and one part is transmitted to the application gateway and the other part is transmitted to the endpoint. In the embodiment, a part of the encryption key, which is generated by an XOR operation between the random number $x_1$ and the random number y1, is transmitted to the application gateway, and a part of the encryption key that is generated by an XOR operation between the random number $y_1$ and the random number $z_1$ is transmitted to the endpoint.

The application gateway generates an encryption key $K_1$ by performing an XOR operation between the part of the encryption key that has been received and the random number $z_1$. The generated encryption key $K_1$ is stored in the endpoint-management table, in which the encryption key $K_1$ is associated with the individual identifier EPID. In addition, the endpoint generates an encryption key $K_1$ by performing an XOR operation between the part of the encryption key that has been received and the random number $x_1$. In this way, both the encryption key $K_1$ generated by the application gateway and the encryption key $K_1$ generated by the endpoint are the values of XOR operations between the three random numbers of $x_1$, $y_1$, and $z_1$, whereby the common keys used for encryption can be commonly held at both the starting point and the ending point of the data linkage.

Thus, at the stage of placing the common keys at both ends of the data linkage, the perfected common keys are never exposed on the communication path, which enables the common keys to be arranged safely without being stolen by a third party. Also, because the random numbers, each of which is a component of the common key, are encrypted by the authenticator, they can be safely transmitted without being stolen.

FIG. 9 is a diagram showing a method, according to the embodiment of the present invention, of an exchange of keys for encryption communication between the starting point and the ending point of the data linkage via a relay gateway. FIG. 9 illustrates the arrangement of the common keys that follows the arrangement of the common keys described with reference to FIG. 8. FIG. 9 shows the flow when the already arranged common keys are exchanged, and the keys are then rearranged. The exchange of the common keys may be performed in every communication session or at predetermined intervals.

When the arrangement of the common keys is completed, both the endpoint and the application gateway store the common keys K1. Also, at this on-an-as-needed-basis key-exchange stage, the payload (D1) of the data that is transmitted from the endpoint is composed of the identifier EPID and the key KEY. First, the endpoint generates a new random number $x_2$, and assigns the individual identifier EPID of the endpoint to D1. EPID, the value of the identifier of the payload. The endpoint assigns the result of an XOR operation between the generated random number $x_2$ and the current common key K1 to D1.KEY, the value of the key of the payload, and transmits the payload (D1) to the relay gateway.

The relay gateway generates a new random number $y_2$, performs an XOR operation between the random number $y_2$ and D1.KEY, the value of the key of the payload received from the endpoint, and transmits the result of this XOR operation (D2.KEY) to the application gateway along with the received individual identifier EPID.

The application gateway extracts the common key K1 associated with the individual identifier EPID from the endpoint-management table, performs an XOR operation between the received D2.KEY and the common key K1, and obtains an operation value (Temp). D2.KEY is the result obtained so that an XOR operation is performed between the random number $x_2$ and the common key K1 that is stored at the endpoint, and, further, an XOR operation is performed between the obtained result of that XOR operation and the random number $y_2$. Therefore, because the application gateway performs an XOR operation between the D2.KEY and the common key K1, the result of an XOR operation between the random number $x_2$ and the random number $y_2$ is obtained.

The application gateway then generates a new random number $z_2$, performs an XOR operation between the operation value (Temp) and the random number $z_2$, and generates a new encryption key K2. Consequently, the encryption key K2 is a value of XOR operations between the three random numbers—the random number $x_2$ generated by the endpoint, the random number $y_2$ generated by the relay gateway, and the random number $z_2$ generated by the application gateway. The generated encryption key K2 is encrypted using the current common key K1, that is, an XOR operation is performed between the encryption key K2 and the common key K1. The result of this XOR operation is transmitted to the endpoint via the relay gateway along with the individual identifier EPID. In accordance with this, the application gateway replaces the common key K1 associated with the individual identifier EPID in the endpoint-management table with the encryption key K2, which becomes a new common key, and the application gateway stores the new common key in the endpoint-management table.

The endpoint receives the result of the XOR operation between the encryption key K2 and the common key K1, and further performs an XOR operation between the received result of the XOR operation and the common key K1 stored at the endpoint, so as to recover the encryption key K2. Thus, the endpoint acquires the common encryption key K2 that is shared with the application gateway, replaces the current common key K1 with this common key K2, and stores this common key K2.

As is described by the explanation above, a key exchange after initial arrangement of the common key has been completed. The above process is also followed in the second and subsequent key exchanges that are made so that the application gateway generates a new encryption key for communication by using random numbers newly generated by each of the endpoint, the relay gateway, and the application gateway, and the application gateway transmits the encryption key to the endpoint, and the endpoint and the application gateway respectively update the encryption key. At this time, the transmission/reception of random numbers are performed after the random numbers have been encrypted by an XOR operation using the current common key, and therefore the random numbers, each of which is a component of the encryption key, are not exchanged while they are exposed on the communication path. Accordingly, the common keys are exchanged safely.

FIG. 10 is a diagram showing a method, according to the embodiment of the present invention, of exchanging keys and of transmitting and receiving data, for encryption communication between the starting point and the ending point of the data linkage via a relay. The diagram shows the basic data flow that accompanies key exchanges between the endpoint and the application gateway. FIG. 10 shows the transmission and reception of data after the initial arrangement of the common key has been brought to completion, and indicates that the finally shared common key is K1. However, even if the finally shared common key is Kn after multiple key exchanges have been performed, the basic data-transmission-and-reception method has not been changed; only the suffix has been changed.

The payload in transmitting and receiving data includes four components: an identifier (EPID), a function ID (FUNC_ID), a key (KEY), and data (Data). Upon transmitting data, the endpoint generates a new random number $x_2$. The endpoint (1) assigns the individual identifier EPID of the endpoint to D1. EPID, the value of the identifier of the payload, (2) assigns the result of the XOR operation between the generated random number $x_2$ and the current first authenticator to D1.KEY, the value of the key of the payload, (3) assigns the result of encoding the data to be transmitted using the current common key K1 to D1.Data, the value of the data of the payload, and (4) transmits D1 to the relay gateway.

The relay gateway generates a new random number $y_2$, performs an XOR operation between the random number $y_2$ and D1. KEY, the value of the key of the payload received from the endpoint, and then transmits the result of this XOR operation (D2.KEY) to the application gateway along with the received individual identifier EPID and data.

The application gateway extracts from the endpoint-management table the common key K1 associated with the individual identifier EPID, performs an XOR operation between the received D2.KEY and the common key K1, and obtains an operation value (Temp). This processing consists of obtaining the result of an XOR operation between the random number $x_2$ and the random number $y_2$ as was explained with reference to FIG. 9. Also, the application gateway decodes the received data using the extracted common key K1. Because the data transmitted from the endpoint is encoded using the common key K1, the non-encrypted data is recovered based on the relationship between the above-mentioned formulas (1) and (2).

The application gateway subsequently (1) generates a new random number $z_2$, (2) performs an XOR operation between the operation value (Temp) and the random number $z_2$, (3) generates a new encryption key K2, which is encrypted by an XOR operation performed between the key K2 and the common key K1 before the key K2 will be transmitted to the endpoint, (4) encodes the response to the received data by using the common key K1, and (5) generates the data to be transmitted to the endpoint.

The encryption key K2 that has been encrypted by using the common key K1 and the response are thus transmitted to the endpoint via the relay gateway along with the individual identifier EPID. In accordance with this, the application gateway replaces the common key K1 associated with the individual identifier EPID in the endpoint-management table with the encryption key K2, which is a new common key, and stores the encryption key K2 in the endpoint-management table.

The endpoint decrypts the encrypted encryption key K2 by performing an XOR operation between the encryption key K2 and the common key K1, and stores the key K2 as the common key K2 at the endpoint, replacing the common key K1. Further, the endpoint decodes the received response using the common key K1 to decrypt and recover the response. In this way, the endpoint encrypts the data and a random number that will be a component of the key used for subsequent communication using a common key, and transmits a payload to the application gateway. The application gateway encrypts both the common key for the subsequent encryption communication generated by three random numbers and the response using the common key, and transmits the payload to the endpoint, whereby the transmission and reception of data and the exchange of common keys for encryption can be performed safely and simultaneously.

In order to maintain high-security communications, it is preferable to update the encryption key each time that data is transmitted and received, as in the embodiment shown in FIG. 10 However, because frequent updating of common keys increases the communication load, it is not necessary that the exchange of keys be performed in each communication session as described above. Based on the premise that the safety of the communication path is ensured, where only data transmission and reception is performed, the transmission and reception of the data is performed so that—without generating a random number for each component—the data encrypted by the common key is transmitted, and the response encrypted by the common key is returned. The transmission and reception of the data and the exchange of the common keys may be independently performed, or performed simultaneously, as shown in FIG. 10. Further, these procedures may be combined as needed.

As explained above, the embodiment of the present invention has been described in detail. The features of the secure-network-communication method according to the present invention can be summarized as follows.

1. Encryption System Independent of Communication Protocols

The system depends on difficulty in predicting random numbers that are generated. The data is encrypted by the endpoint just before it is transmitted, and it is decrypted by the application gateway immediately before reaching the associate application. Therefore, even if the communication protocols of the communication in the communication path are in a path formed of many layers, the data never returns to plaintext in the path, whereby this encryption system does not depend on communication protocols.

2. Simple Authentication and Key-Exchange Protocol (Compared with the Protocols Including SSL)

Authenticators asymmetric to each other calculated by a hash function and an encryption/decryption function used for encoding/decoding processing are registered in advance as management information at the endpoint and at the application gateway, so that any data that comes from the endpoint and that is not associated with the information registered at the endpoint can be rejected by the relay gateway. As shown in FIG. 8, processing between protocols from authentications to key exchanges is performed by communication of the two components having two different key lengths, two different hash functions, and two different logical operations (XOR operations), so that this method is quite efficient in that it does not require large calculations, as, for example, the RSA (public key) method requires. Accordingly, this method is unquestionably applicable to the endpoint that incorporates a small LSI having a mere 8 Kbytes of RAM. In the protocol relating to the process of exchanging common keys, this method adopts a common-key-encryption system that is based on difficulty in predicting random numbers to be generated, in which the keys are generated by three random numbers. Accordingly, this method has a feature that the strength of encryption is determined on the premise that each random number is independent of each other random number. Because of the feature that each random number is generated independently, this method can utilize a random-number-generation method that uses natural phenomena such as semiconductor thermal noises as an entropy source, whereby this method can enhance the difficulty in predicting common keys, i.e., can increase the strength of the common keys.

3. Authentication Using a Whitelist and Timeline Log, and Prevention of Spoofing The timeline log in which management information is recorded does not just record time stamps originating from times, but records timeline IDs calculated by encrypting authenticators. These timeline IDs are calculated by encrypting an authenticator that is calculated by a random number using the immediately previous timeline ID, so that the timeline ID has preciseness based on the probability of random-number generation, and the irreversibility of the timeline ID is maintained. Also, by using the authenticator stored in management information and the latest timeline ID, the authenticator of one generation previous can be calculated. By using this feature, the timeline log can be traced back, so that the initial value of the authenticator recorded in the nonvolatile memory of the endpoint can be calculated. Accordingly, even if a spoofing attack is successful, by using the authenticators in the management information and the timeline log, the valid endpoint can be confirmed.

4. Stream Cipher with Less Redundancy, and Efficient Encryption/Decryption Method without Relying on Calculations At the common-key-exchange stage, only the logical operation of XOR and the hash function are used. The communication overhead is about twice as long as the key length, and therefore this method is much more efficient than a key-exchange protocol such as SSL in light of the amount of computation and the communication performed by such a protocol. Also, in the encryption/decryption process, the encryption is made by performing an XOR operation between a random number stream that is obtained from a pseudo-random-number generator, and that is initialized using the immediately previous common key and the bits having the same length of the transmitted message from an offset position as does the random number stream. Therefore, in addition to the advantage that the amount of calculation is small, there is no need for a calculation buffer for the calculation of encryption. Because of these features, smaller LSIs can be used for this communication method as compared with the LSIs used for other encryption methods.

5. Seamless Encryption of the Transmission Path of Data is not Required.

That is, the data is encrypted at the application layer of the endpoint and is decrypted at the layer of the associate application, so that the data will never be plaintext during the communication. Also, seamless data linkage between the starting point and the ending point independent of communication protocols becomes possible.

6. Independence of a Function Unit

There are provided an entry and an exit for encryption and decryption of data at both the front and rear of the communication path. The API is further equipped with independent logical functions in order to allow for system scalability. It is possible to have each function unit operate independently by making the application API dynamically connect each data content to each execution program based on each function ID unit, and by allowing each function unit to operate independently.

Although the embodiment of the present invention has been described in detail with reference to the drawings, the present invention is not limited to the above-described embodiment, and various modifications may be made without departing from the technical scope of the present invention.

DESCRIPTION OF REFERENCE SIGNS 10 endpoint
11 endpoint API
20 relay gateway
30 application gateway
31 application API
32 associate application DB
33 network-information-management memory
40 PAN
50 the Internet

The invention claimed is:

1. A secure-network-communication method comprising an endpoint and a relay gateway connected with a first network, and an application gateway connected to the relay gateway via a second network, said method comprising:

initialization of each endpoint, whereby the application gateway generates first and second authenticators that are asymmetrical to each other based on an individual identifier that is unique to each endpoint and an authentication password, and the second authenticator is stored in a whitelist for management and the first authenticator is stored in the endpoint;

authentication at the initialization of the endpoint, whereby the relay gateway receives, from the endpoint, data that includes an individual identifier and an operation value obtained from the encrypted first authenticator, and determines the validity of the first authenticator; if the relay gateway determines that the first authenticator is valid, it generates new asymmetric first and second authenticators using randomly generated numbers, and then transmits the authenticators to the application gateway, so that the application gateway updates the second authenticator in the whitelist and adds a record to a timeline log, and the endpoint updates and stores the first authenticator; and arrangement of common keys, whereby the relay gateway receives a first number randomly generated by the endpoint and a third number randomly generated by the application gateway; the relay gateway generates part of an encryption key using a second number randomly generated by the relay gateway and the first random number, and transmits that part of the encryption key to the application gateway; the relay gateway generates another part of an encryption key using the second random number and the third random number, and transmits said another part of the encryption key to the endpoint; the application gateway generates an encryption key by using said another part of the encryption key and the third random number, and stores the generated encryption key in the whitelist; and the endpoint generates an encryption key by using the other part of the encryption key and the first random number, and then stores the generated encryption key.

2. The secure-network-communication method according to claim 1, wherein the relay gateway receives from the endpoint data that includes the individual identifier and the operation value obtained from the encrypted first authenticator, and determines the validity of the first authenticator; if the relay gateway determines that the first authenticator is valid, it generates new asymmetric first and second authenticators using newly randomly generated numbers, and transmits the authenticators to the application gateway, so that the application gateway updates the second authenticator in the whitelist, and adds the record to the timeline log; and the endpoint then updates and stores the first authenticator.

3. The secure-network-communication method according to claim 1, further comprising, on an as-needed basis, a key-exchange stage where the application gateway generates a new encryption key for communication by using random numbers newly generated by each of the endpoint, the relay gateway, and the application gateway, and transmits the encryption key to the endpoint; and then the endpoint and the application gateway respectively update the encryption key.

4. The secure-network-communication method according to claim 1, wherein the second authenticator at the initialization stage of the endpoint is the value of an XOR operation between the hash value of the individual identifier and the hash value of the authentication password, and the first authenticator is the result obtained by encoding the second authenticator using a master key that is predetermined for authentication in the network system.

5. The secure-network-communication method according to claim 1, wherein, at the authentication stage of the initialization of the endpoint,
an operation value obtained from the encrypted first authenticator is the hash value of the encrypted first authenticator;
the data received from the endpoint further comprises the hash value of a number randomly generated by the endpoint; and
the validity of the first authenticator is determined by comparing: (1) the hash value of the result obtained by decoding the second authenticator extracted from the whitelist corresponding to the individual authenticator using the master key; (2) the operation value obtained from the hash value of the received encrypted first authenticator; and (3) the hash value of the received random number.

6. The secure-network-communication method according to claim 1, wherein a new second authenticator at the authentication stage of the initialization of the endpoint is the value of an XOR operation between the number randomly generated by the relay gateway and the second authenticator extracted from the whitelist corresponding to the individual authenticator, and a new first authenticator is obtained by encoding the new second authenticator using the master key.

7. The secure-network-communication method according to claim 1, wherein, at the stage when the common keys are being arranged, one part of the encryption key is the value of an XOR operation between the first random number and the second random number, the other part of the encryption key is the value of an XOR operation between the second random number and the third random number, and both the encryption key generated by the application gateway and the encryption key generated by the endpoint are respective values of an XOR operation between the first random number, the second random number, and the third random number.

8. The secure-network-communication method according to claim 1, further comprising a stage wherein a payload that includes data generated or acquired by the endpoint is transmitted to the application gateway via the relay gateway,
wherein the payload is composed of four frames, i.e., an individual identifier, a function ID that represents a function, an encryption key, and data;
the value obtained by encoding the data to be transmitted by using the latest encryption key is placed in the frame of the data; and
the transmitted date is decoded by the application gateway using the latest encryption key so as to be decrypted.

9. The secure-network-communication method according to claim 1, wherein the first network is a wireless local network and the second network is the Internet with TCP.

10. The secure-network-communication method according to claim 1, wherein the timeline log is recorded by storing, in memory for recording the timeline log, an individual identifier, a time stamp, and the value obtained by encoding the second authentication using the hash value of the authentication password;
a record is added to the timeline log by additionally storing an individual identifier, a new time stamp, and the value obtained by encoding the latest second authentication using the hash value of the authentication password in memory for recording the timeline log; and
the initial value of the first authenticator can be obtained so that a value is obtained by encoding the second authenticator recorded in the timeline log by using the hash value of the authentication password; the obtained value is used to retrospectively decode each of the second authenticators; and the finally obtained value of the second authentication is decoded using the master key, which results in the initial value of the first authenticator.

* * * * *